(12) United States Patent
Herberger et al.

(10) Patent No.: US 7,599,710 B2
(45) Date of Patent: *Oct. 6, 2009

(54) SYSTEM AND METHOD OF UTILIZING A REMOTE SERVER TO CREATE MOVIES AND SLIDE SHOWS FOR VIEWING ON A CELLULAR TELEPHONE

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 577 days.

This patent is subject to a terminal disclaimer.

(21) Appl. No.: 11/402,436

(22) Filed: Apr. 12, 2006

(65) Prior Publication Data

US 2006/0234765 A1 Oct. 19, 2006

Related U.S. Application Data

(60) Provisional application No. 60/672,142, filed on Apr. 15, 2005.

(51) Int. Cl.
*H04M 1/00* (2006.01)
(52) U.S. Cl. ............. 455/552.1; 455/556.1; 455/414.1; 455/557; 725/62
(58) Field of Classification Search ............... 455/557, 455/558, 566, 95, 41.2, 41.3, 3.03, 3.06, 455/412.1, 412.2, 414.1, 414.4, 419, 420, 455/552.1, 556.1; 715/731, 723; 717/100; 725/62
See application file for complete search history.

(56) References Cited

U.S. PATENT DOCUMENTS

| | | | |
|---|---|---|---|
| 6,812,971 B2 | 11/2004 | Terane | |
| 6,943,845 B2* | 9/2005 | Mizutome et al. | 348/555 |
| 2002/0080091 A1* | 6/2002 | Acharya et al. | 345/2.1 |
| 2003/0046688 A1* | 3/2003 | Yoshido | 725/32 |
| 2003/0210331 A1 | 11/2003 | Battles et al. | |
| 2004/0004737 A1 | 1/2004 | Kahn et al. | |
| 2004/0023686 A1 | 2/2004 | King et al. | |
| 2004/0067770 A1 | 4/2004 | King et al. | |
| 2004/0114904 A1 | 6/2004 | Sun et al. | |
| 2004/0201691 A1 | 10/2004 | Bryant et al. | |
| 2004/0201692 A1 | 10/2004 | Parulski et al. | |

(Continued)

OTHER PUBLICATIONS

Keronsoft "Mobileshow" web site printout, Oct. 9, 2006.

*Primary Examiner*—Tan Trinh
(74) *Attorney, Agent, or Firm*—Fellers, Snider, Blankenship, Bailey & Tippens, P.C.; Terry L. Watt (57) ABSTRACT

There is provided herein a system and method for automatically creating digital video works within a remote server based on digital image content contained in a user's camera cell phone or attached memory card. In the preferred arrangement, the cell phone owner will begin by selecting digital content (e.g., still images and/or video clips) that is to appear in the video work. Optionally, the user will also select a video theme or style that is to be given to the video. The details of the user's choices and the selected video images will be sent to a remote server where the video work will be automatically created. The completed video will then be transmitted back to the user for viewing on his or her own cell phone, thereby creating a custom video work without requiring interaction with a desktop or laptop personal computer.

23 Claims, 6 Drawing Sheets

U.S. PATENT DOCUMENTS

2004/0210845 A1* 10/2004 Paul et al. .................. 715/731
2005/0041131 A1   2/2005 Terane
2008/0125031 A1*  5/2008 Fadell et al. ............... 455/3.06
2008/0195997 A1*  8/2008 Herberger et al. ........... 717/100

* cited by examiner

SYSTEM AND METHOD OF UTILIZING A REMOTE SERVER TO CREATE MOVIES AND SLIDE SHOWS FOR VIEWING ON A CELLULAR TELEPHONE

FIELD OF THE INVENTION

The present invention relates generally to the field of digital photography and digital imaging. More particularly, but not by way of limitation, the present invention relates to a system and method of creating and displaying multimedia content for display on a cellular telephone.

BACKGROUND OF THE INVENTION

Today the cell phone is an important part of life for most people. The companies that develop and manufacture cell phones are continually striving to differentiate their own devices from those of their competitors by adding more and more features to each new product. Over the past few years cell phones developed from mere communications devices into multimedia hubs that enable the user to capture video sequences, to take pictures, to listen to radio, to play games and to listen to, view multimedia files, etc. Additionally, based on the latest technological advances cell phone users are now able to connect to the Internet and utilize most of the functions that a desktop PC Internet user is accustomed to having at his disposal.

This evolution in features did not, of course, take place over night. Instead, consumers have experienced a series of gradual changes as cell phones were transformed from the unwieldy bag phone of yesterday to today's modem compact phones that are not much larger than a candy bar. This trend, however, has slowed somewhat of late by the decision to include photo functionality in many cell phones and also by the addition of more and more multimedia functionality.

But changes in phone sizes are only the most obvious manifestation of technological advance. The first generation portable phones that were equipped with multimedia features had disadvantages that made such devices—desirable only by the techno-enthusiast but not by the general public. Further, these devices could only store a limited amount of video data and the quality of the material stored there was very poor. As a consequence, the user had no real incentive to keep the material or to even try to move it to another device, for example to a PC, for further processing. Of course, similar problems have existed with respect to the quality of digital photos that are acquired via in-phone cameras. Digital still picture quality has never been a strong feature of cellular telephones and the quality of the image that has been traditionally available from in-phone cameras has tended to be suitable only for display on the small LCD screens of a phone: importing those photos to a PC will only make obvious their low-resolution character. Users of cell phones have come to expect that an in-phone camera will take pictures that are most likely suitable only for display on the phone that took them and that such images are vastly inferior to those collected by a dedicated digital camera.

In recent years, however, cell phone companies have begun to improve the quality and sophistication of their in-phone cameras to the point where some phones produce images that are on par with low-end dedicated digital cameras. Compared to the range of digital photo cameras the cell phones with photo capability are still at a disadvantage regarding the quality, but the pictures that can be taken with cell phones are a definite step up in quality and functionality as compared with early models.

In the case of dedicated digital cameras, an entire industry has arisen to assist the user in getting images from inside of his or her camera and into print. For example, wired and wireless connections have been developed to make it easy for the user to migrate his or her photos from inside of the camera to a PC (or, in some instances, directly to a printer), software has been created that simplifies the process of editing and retouching digital photos, additional software has been developed that allows the user to print images, send them to third parties electronically, post them on the web, etc. Further, in some cases service bureaus have been created that are intended to make the process of moving digital photos from camera to paper even easier by automating many of the steps that would otherwise need to be performed by the camera owner. In short, the owner of a digital camera has a wide range of options when it comes to editing and printing his or her images.

Users of cell phones, however, have more limited options with respect to the images that are acquired via their phones. Of course, if the digital photo is transmitted to a PC it can be processed like any other digital image, including those from a digital camera. However, such a transfer typically requires that a connection of some sort be established between the phone and a PC. Depending on how the transfer is accomplished (e.g., via Bluetooth) the phone may need to be brought into proximity with the receiving PC. In those instances where the Internet is used to transfer the file (e.g., e-mail), the user will need to travel to the location of the PC in order to be able to view and edit the photo. However, these sorts of requirements are at odds with the mobile nature of the cell phone. The cell phone is a device that is meant to be fully functional away from a fixed location and, to the extent that that part of its functionality is tied to a stationary computer, this will tend to frustrate the central function of a cell phone.

Finally, although the user's phone might contain a large number of captured or downloaded digital images, it has heretofore been difficult to access and utilize the bulk of those images. It is certainly possible to, say, select an individual image to act as a display screen background or "wall paper", but what is often desired is the ability to create—and view the stored images in sequence as is often done on a computer, i.e., to create and view a slide show. However, cell phones do not conventionally have such a built-in function and certainly do not have the editing tools to create "interesting" slide shows with custom fades, wipes, etc., functionality that is commonplace on the user's PC.

Thus what is needed is a method that provides the user of a modem cell phone with the option of using a cell phone in its truest sense and still enables the user to perform some functions that are normally only available to the user via connection with a desktop or other computer. Preferably the method will enable a user to automatically initiate the creation of a slide show or other multimedia presentation from the cell phone. Further, preferably the user will be required only to select specific pictures or other multimedia material resident on the users cell phone, which selected images will be integrated into the video presentation. Finally, it is preferred that the process of actually assembling the multimedia work not be carried out on the cell phone but instead automatically take place on another processing station, a remote server for example, thereby relieving the user's cell phone of the computational load necessary to create a video slide show locally.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for automatically creating video presentations that are designed to be viewed on a cell phone but that are compiled on a remote server, wherein the remote server preferably assembles the video based on directions issued by the cell phone user. The system and method is primarily intended for use in connection with the cell phone market but, more generally, would be suitable for application to any mobile computing device (such as a PDA) that has camera functionality and the capability of connecting to the Internet or, locally to a computer via, for example, Bluetooth.

In brief, the instant invention enables the user to quickly create professional looking video clips from his or her cell phone images without requiring an intimate knowledge of the operation of a video editing or similar program. The resulting video presentation will be displayed locally on a user's cell phone and might be played from its storage location in cell phone memory, or streamed to a user from the remote server.

According to a preferred embodiment the instant invention preferably begins with the selection of specific pictures or alternative multimedia material by the user. The selection will preferably be carried out with the assistance of cell-phone resident software. The user will preferably select his favourite pictures from among the plurality of available and locally stored pictures digital images. Those of ordinary skill in the art will recognize that it is also possible to expand the scope of the instant invention to work with digital video sequences and/or digital music sequences in the sense that these elements can similarly be selected by the user and incorporated into a composite video work on a remote server. Thus, in general, it is should be understood that when digital images are referred to herein as the components of a user defined video work, that term (i.e., "digital image") should be broadly construed to include any multimedia material that would be available on the users cell phone and which a user might want to make a part of an integrated video work according to the methods of the instant invention As a next step the user will preferably select a specific video style which he would like to use for creating the presentation. A plurality of specific styles will preferably be provided to the user, wherein each style features specific details that differentiate a created movie show presentation from each other.

As a next preferred step the instant invention will preferably display a summary to the user wherein the user is presented with a listing of his previous media item selections to allow the user to verify that he has selected the correct files. After the user becomes satisfied with his selection, he will be able to initiate a "send" command which will signal to the resident software that the selected multimedia data items are to be gathered and transmitted to the remote server. The transmitted data will preferably consist of the selected images, the selected video style, the user's cell phone number and an identification code unique to that model of cell phone. The pictures will preferably be transmitted in the same size as they are stored on the cell phone, so that the quality of the source material is not degraded any-more than is required. Additionally and preferably, ancillary information such as the selected video style, the identification code of the user's cell phone, etc., will be transmitted in the form of short alphanumeric strings or codes that can be recognized on the remote server and associated with the user's program selections, phone type etc. Note that in the case of the identification code, knowledge of the user's phone model will allow the remote server to select specific encoding settings that are designed to exactly match the type of cell phone, thereby ensuring that the resulting video work is playable at the highest possible quality on the users cell phone. Note also that by using codes to communicate program selections, the volume of data that must be transmitted from the user's cell to the remote server is reduced, thereby reducing the transmission cost (which is typically based on the number of kilobytes transferred) to the user. On the server side, the instant invention preferably receives and stores the cell phone data in a custom database that resides on the remote server, the database preferably containing one or more user specific data sets, that will preferably be identified by the cell phone number that is automatically transmitted along with the user's program option selections. Additionally the transmitted digital images, the style code, the cell phone identification code, and possibly some payment details (e.g., credit card information) will preferably also be stored in the database.

The remote server preferably receives the data from the user's cell phone and stores it for further processing. As a next preferred step, the instant invention analyzes the stored data, extracts the identification code, and determines the style code. The instant invention further compares the cell phone identification code with values that have been previously stored in a server-side database to determine the best encoding settings for that particular cell phone model. For example, based on the user's phone type the remote server can identify the video formats that are supported on that cell phone and additionally determine the appropriate settings for video and audio bit rate, etc Similarly the style code is used to determine the settings that will preferably be used when the slideshow presentation is created. Among the properties or parameters that might be determined by a user's selection of a particular style include: slide transition type and frequency, the type of audio material that is to be added to the video work, the display duration of each digital image, the type of intro and/or extro messages in the multimedia work, the addition (or not) of background images, the frequency and type of added effects, etc. All these properties are preferably incorporated in the selected style and, thus, largely defined by that style. The comparison of the cell phone identification code is similar to the comparison of the style code.

In a next preferred step the instant invention will assemble and create the user's specified multimedia presentation on the remote server. To help ensure that the resulting video quality is the best possible for the user's particular type of cell phone, the instant invention preferably transforms the selected digital images to a video format suitable for/optimized for display on the user's phone according to video editing techniques well known to those of ordinary skill in the art. The instant invention preferably assembles the video work from the digital information provided and applies the specific characteristics of the selected video style to the user-selected images. In some instances, the video properties will be applied uniformly to all selected images and in other embodiments the properties will be applied in a random fashion. For example, the video properties that are suitable for random assignment might include the slide transition frequency and the frequency with which—video effects are applied. In other instances, parameters such as transition type, background audio material, display duration, type of intro and/or extro messages, background images, the type of supported effects, etc., might be randomly assigned. As a specific example, a wipe transition between slides might be requested by the user to be applied three times in the selected style, but in some preferred embodiments the number and type of slide-to-slide transitions might be random. On the other hand, the term "static parameters" will be used to refer to parameters that are applied to the video presentation exactly as they were selected by the user (or provided as a default value). By mixing random and static parameters within a style definition, repeated submissions of the same images might result in slide shows that are potentially never exactly the same. Thus, this preferred aspect of the instant invention provides some small amount of additional incentive for users to utilize the methods discussed herein.

After the user's video slide show has been assembled, it will preferably be stored on the remote server. Afterward, the instant invention will preferably contact the user's cell phone by sending a text message with an Internet link therein to the user. In some embodiments, the text message will contain information on how to access the stored video file. This link is preferably transmitted via a short message to the cell phone user, although it could also be transmitted via any communication method available on a modem cell phone. The instant invention will preferably contact the cell phone user by using the previously received and stored cell phone number. After receiving the short message or other notice from the remote server, the cell phone user will preferably be able to select the supplied link to access the created movie show presentation.

As a next preferred step, the user of the cell phone will access the remotely stored video on the server. This access might be carried out in a variety of different ways. For example, the user could download the complete video file to the cell phone in order to store it locally and to view it multiple times. In other preferred variations, the user will be able to stream the video file with the video being watched in real time as it is transmitted. The real-time viewing may or may not—simultaneously or afterward—result in the video work being stored on the user's cell phone. Additionally, those of ordinary skill in the art will recognize that the cell phone user can forward the message that he or she receives to one or more cell phones, a couple of friends for example, so that they would also be able to access the video work on their cell phones. That being said, since the video work was customized and/or optimized for the requestor's phone, the display quality may not be the best for the cell phones of the other recipients.

It should be clear that an approach such as this would be a tremendous aid to the user of a modern cell phone and would additionally mean—an increase in the importance of cell phone cameras, because by using the instant invention the user will be able to quickly transform his own photographic and other material into a professional looking video which will be viewable on a cell phone in a few minutes. The instant invention eliminates the need to master the many complex and cumbersome tasks that would traditionally be required to create such a video work (e.g., connecting the cell phone to the computer, transferring the pictures to the computer, creating a video slide show using video editing software on the computer, choosing the display parameters of the video work to match the capabilities of the user's phone, transferring the movie back to the cell phone, etc.). The instant invention enhances the functionality of cell phone cameras and allows the user to operate the phone as a truly independent device in that the user is not required to switch to another device when creating a slide show. After the user initiates the video creation process, the instant invention thereafter creates the movie without the user's further input and returns it to the local cell phone where the user will be able to enjoy a professional quality video work.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein like reference numerals indicate the same parts throughout the several views, there is provided a preferred system and method for automatically creating movies for viewing on mobile devices in a client-server arrangement.

By way of general explanation and in accord with the preferred embodiment, it is to be understand that when the phrase "automatically creating a video works on a mobile device" is used herein that usage will preferably be interpreted as meaning creating a video file or similar continuously viewable file based on user selected digital input materials, wherein the digital material has preferably been created and stored on a users camera cell phone. The instant invention will preferably utilize a two-stage process, with one stage taking place within the user's cell phone and the second stage taking place within a remote server. The instant processes can also be described as a "user-participated", a "user-autonomic" or an "automatic" processes. The user will select the features that are necessary to create the video presentation using an interface written for his or her cell phone, with the actual compilation of the video being performed remotely without input by the user, For purposes of the instant embodiment it should be understood that the invention preferably seeks to enable a user to exploit the full multimedia functionality of modem camera cell phones. To achieve this goal the instant invention enables the user to create video works from previously created multimedia material using, for example, pictures that might be resident within that camera cell phone. Further, the instant invention will allow the video work to be created without requiring any direct interaction with a computer during the process of creation. Additionally, the instant invention will deliver the video work directly to the cell phone of the requesting user, preferably in a matter of minutes, after the user has selected the features of the photo slideshow. The video file can be distributed to the user in a direct download, via streaming broadcast, or other methods well known to someone of ordinary skill in the art. The specific workflows and the additional specifications regarding the instant invention will be described in more detail below.

Figure 1:
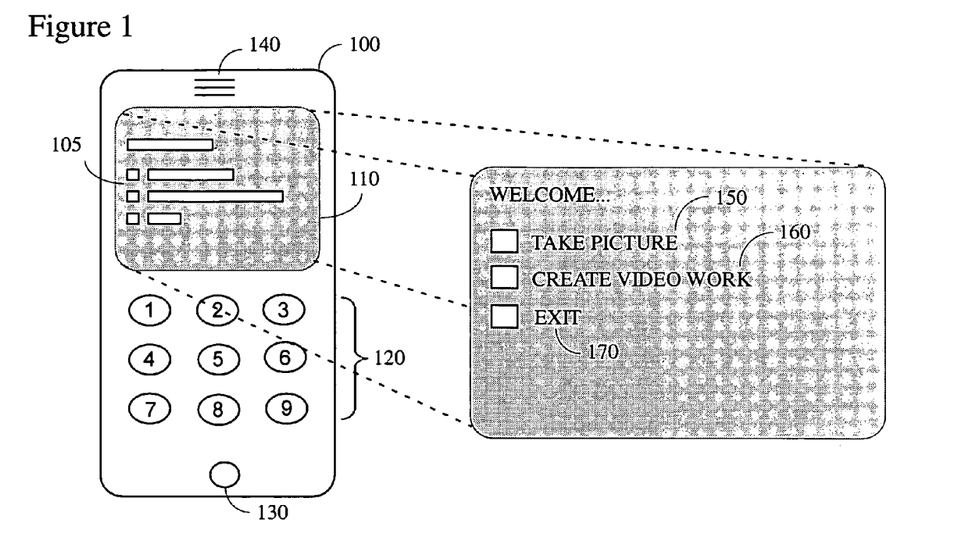
FIG. 1 illustrates a preferred environment for the instant invention.

As is generally indicated in FIG. 1, at least a portion of the instant invention will be implemented in form of software running on a user's cell phone 100. Such a cell phone will preferably have some amount of internal program memory and data storage (e.g. computer RAM) of the sort that is normally supplied with such units. Additionally it is anticipated that the cell phone will utilize a speaker 140 and a microphone 130 or a separate speaker/amplifier combination that is in electronic communication with the cell phone 100. Thus, for purposes of the instant disclosure when the term "speaker" is used that term should be broadly construed to include any of the one or more speakers that might be utilized by a cell phone. Further, in the most preferred embodiment the cell phone will be equipped with a digital camera (not pictured) of the sort commonly found on such devices.

According to a preferred arrangement, and as is generally indicated in at least FIGS. 1, 3, 4, 5, 6, 7 and 8, a cell phone 100 suitable for carrying out the instant invention will preferably contain software resident therein that presents the user with menu choices 105 (FIG. 1 and following) via the cell phone display 110. As indicated in FIG. 1, in a preferred arrangement a user will interact with the instant invention by way of the graphical display 110 (e.g., a color LCD display) of the cell phone 100 or other mobile computing device (e.g. a handheld computer/PDA, a combination cell phone PDA, etc.). Preferably, a selection menu with screen layout 105 similar to that which appears on the display 110 will be provided to the user to allow him or her to select specific functions of the software. The user might for example choose to capture images for use with the instant invention by selecting the "take picture" option 150 of the selection menu.

If the user wants to initiate the creation of a video work according to the methods of the instant invention he or she might select the "create video" menu option 160. Alternatively if the user wants to use the more generic functions of the camera cell phone he or she might select the "exit" option of the selection menu 170.

The standard telephone keypad 120 can be used for the purpose of scrolling and/or selecting from among the menu items 105 or, alternatively, the various special function keys that are often provided with the cell phone 100 could also be used for the same purpose. Finally, many cell phones and other devices utilize "soft keys" which are graphical representations of buttons that are drawn on the display device 110 and which could also be used to receive instructions from a user. Those of ordinary skill in the art will recognize that interaction with the user can also be carried out by use of different methods and/or devices (to include the use of peripherals that have been attached to the cell phone) and are not limited to the use of the physical buttons that might be present on the face of the selected device.

Figure 3:
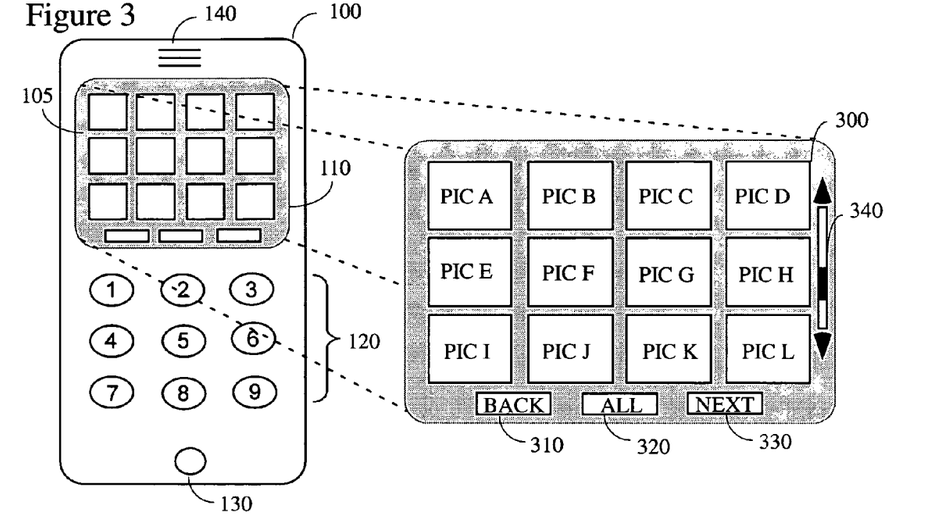
FIG. 3 illustrates the graphical user interface on the camera cell phone of the instant invention at a first phase.

Turning next to FIG. 3, this figure illustrates a preferred first phase of the instant invention following the selection of the "create video" menu option in FIG. 1. The instant invention preferably presents the user with a menu of all of the available pictures 300 that are stored in the memory of the current cell phone. Additionally it might be possible for the user invention to access a memory expansion card, which cards offer substantial auxiliary storage and are increasingly being made available for cell phone types. It should be noted that there are many different ways that a user might store and recall digital images on a cell phone and how such digital information is stored and accessed is immaterial to the operation of the instant invention.

In the preferred embodiment, the user will be able to navigate through the displayed pictures using a generic navigation control 340. The display of the available pictures is presented to the user to allow him or her to select the pictures that are to be included in the video work.

Figure 4:
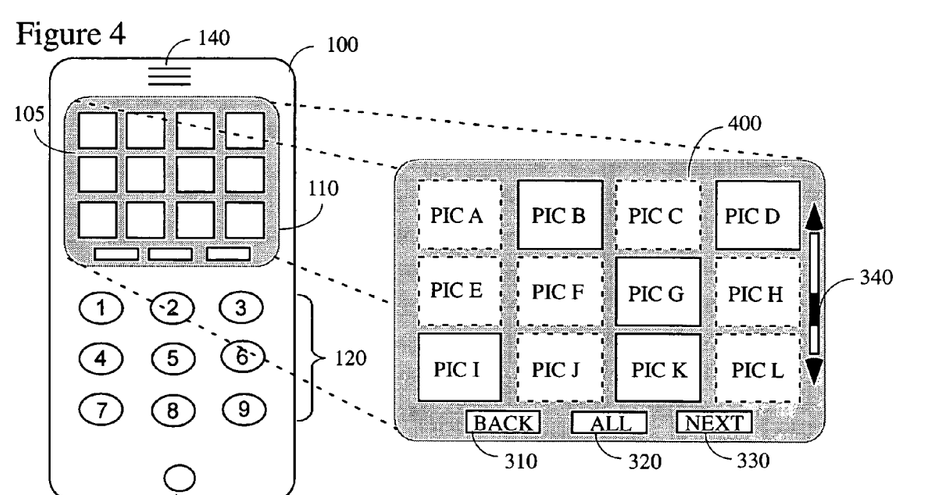
FIG. 4 depicts the graphical user interface on the camera cell phone at a second phase of the instant invention.

FIG. 4 illustrates a preferred appearance of the instant invention after the user has selected seven of the images for inclusion in the video work. In one preferred arrangement and as is illustrated in this figure, the pictures that have been selected might be highlighted by a dotted frame 400 that has been drawn around their perimeter. Those of ordinary skill in the art will recognize that the selected pictures might be indicated in any number of different ways. Additionally it should be noted that instead of using digital pictures on the cell phone the instant invention could be adapted to support a plurality of other digital materials, for example video sequences (e.g., video clips) or audio sequences (e.g., digital recordings, MIDI files, etc.). Thus, it should be noted that the use of the term "digital pictures" to describe the sort of input data sources that would be suitable for use with the instant invention should be broadly construed to include other sorts of digital audio, video, etc., sources that can be combined into unified video work.

The user preferably makes his or her selection via generic keypad 120 that is an integral component of the cell phone 100. Additionally the user will preferably be presented with several options that simplify the process of interacting with the instant invention. For example, a "back" button 310 is preferably provided to allow the user to return to the start screen of the instant invention or which at least allows the user to go back one section in the menu structure. The "all" button 320 preferably allows the user to quickly select all pictures for the creation of the video work, thereby allowing the user to avoid the lengthy process of individually selecting many digital media items. With the activation of the "next" button 330 the user will preferably signal to the instant invention that the selection phase of the pictures is over and that the user wants to move on to the next phase of the movie show presentation process.

Figure 5:
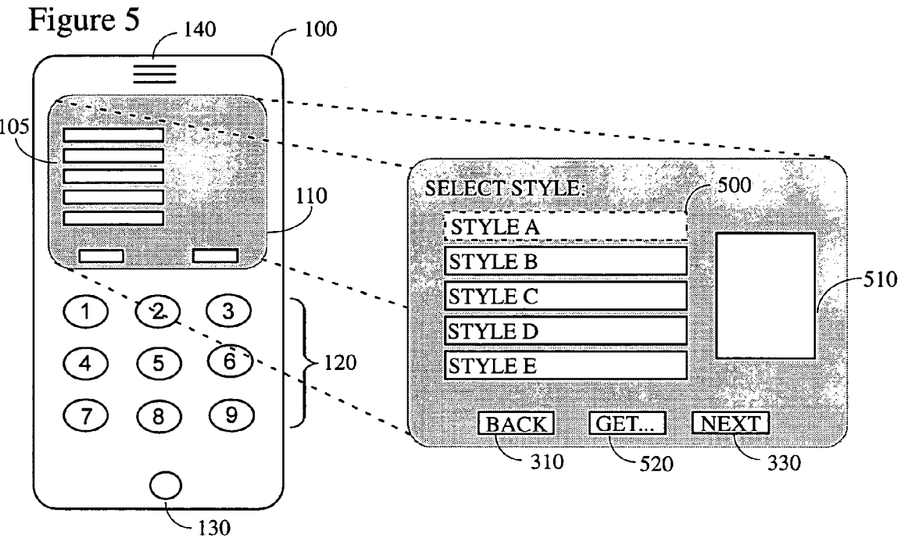
FIG. 5 depicts the graphical user interface on the camera cell phone at a third phase of the instant invention.

FIG. 5 illustrates a screen display of the sort that is preferably presented to the user of the instant invention when the "next" button 330 (FIG. 4) has been chosen, thereby indicating that the selection phase of the pictures has been completed. As a next step, the user will preferably be required to choose a specific style for the video slide show. The user will preferably be presented with a variety of pre-defined movie styles 500 using a menu of the sort generally indicated in FIG. 5. The names and essential features of the styles will preferably have been previously stored in the memory of the cell phone and an information box 510 will preferably be automatically filled with information about the currently selected style when the user positions the selection cursor over one style. In this information box 510 a short description of the selected style will preferably be displayed, wherein this description might be a simple listing of the features of the selected style or it might be possible to display a short summary movie showing an example of the selected style in use. The video styles are preferably predefined and installed with the software of the instant invention and therefore do not require any editing on the part of the user. Of course, whether or not to allow a user to edit these style definitions is a matter that is left to the discretion of the programmer who develops the user's software.

Additionally the instant invention might be designed to allow the user to purchase or receive additional styles from a remote source by selection of the "get . . . " button 520. The additional styles could be automatically provided to the user on a regularly scheduled basis or the user could be permitted to select and download new styles on demand. Of course, one of ordinary skill in the art will recognize that it might also be possible to allow the user to create and upload (e.g., back to a central server) his or her own video styles. However, that is not the preferred embodiment.

The generic navigation buttons "back" 310 and "next" 330 will preferably enable the user to move backward and forward through the different menus/steps of the instant invention. Preferably, selection of the "back" button 310 will send the user back to the picture selection step, and the selection of the "next" button 330 will signal to the instant invention that the user has completed both the picture selection step and the style selection step.

Figure 6:
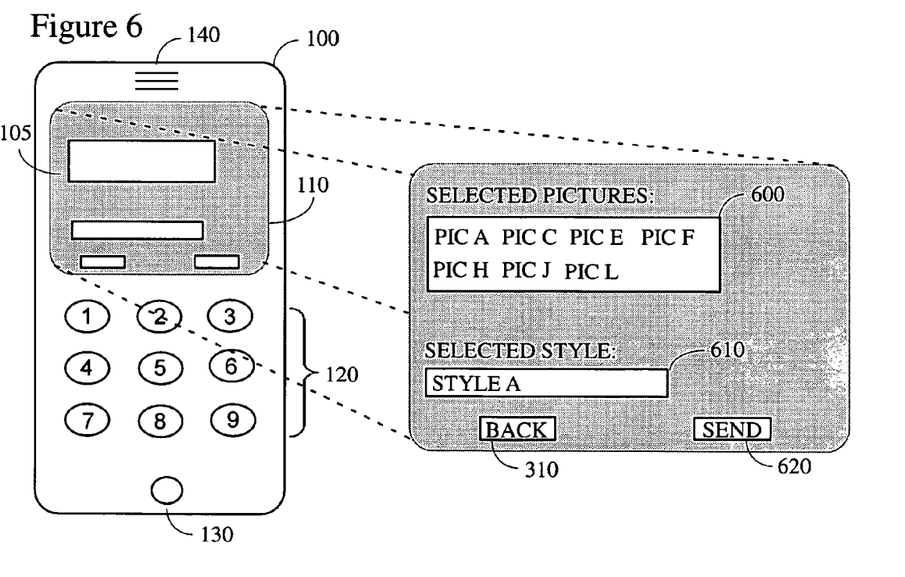
FIG. 6 illustrates the graphical user interface of the instant invention in a fourth phase.

Turning next to FIG. 6, after indicating that the picture and style selection is completed the user will preferably be presented with a summary of his or her previous selections. The selected images will preferably be displayed 600 along with some indication of the selected style 610. If the user is not satisfied with the selection, or if the user notices that he made an error, he will be able to return to each previous step by using the "back" button 310. If the user is satisfied with the selection and he wants to initiate the creation of the video working using the selected data items, he will activate the "send" button 620, thereby causing the transfer of the required information to a remote server. Preferably, the contact information that is used to access the remote server will be stored internally within the users cell phone as data within the software that implements the invention.

The steps that take place during the "automatic" phase of the instant invention will be explained in greater detail hereinafter in conjunction with FIG. 10 and shall therefore not be described in detail here. In the preferred arrangement, the remote server receives the information from the cell phone and, after analysis of the transmitted digital images, instruction codes, etc., the instant invention creates a video work according to the parameters selected by the user. In the preferred arrangement, the video work will be an integrated digital video file that has been explicitly created to match—the technical features and capabilities of the user's cell phone.

Figure 7:
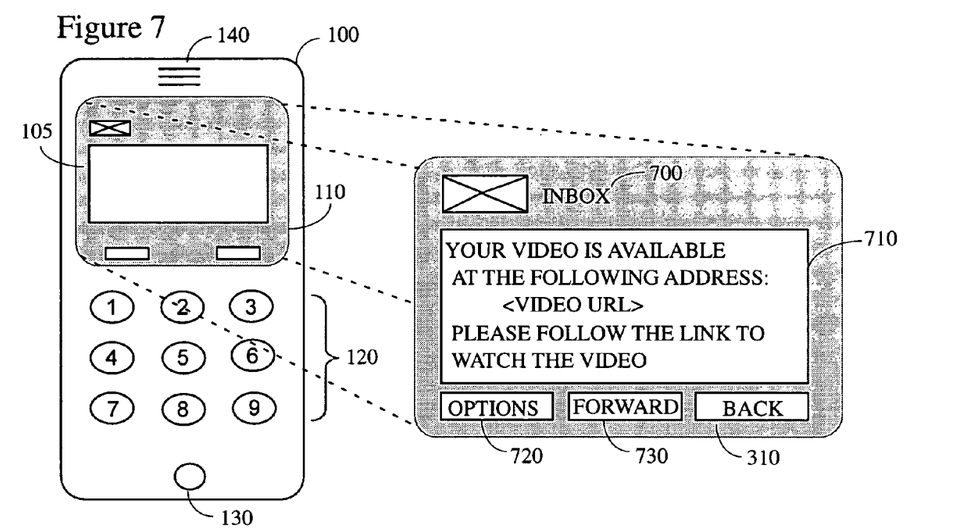
FIG. 7 illustrates a possible way of relaying the link to the created movie show presentation to the camera cell phone of the user.

Preferably the video file will be assembled and stored on the remote server and the remote server will preferably contact the user's cell phone when the video work is ready for viewing by sending a short message to the phone. In the short message the user will preferably be informed that the remote server has completed the creation of the desired photo slideshow presentation and the message will preferably additionally contain a link to the created digital video file. An example of a possible representation of how the short notification message might appear on a users cell phone is illustrated in FIG. 7. The short message will preferably be transmitted like any other generic short message and will be stored in the inbox 700 of the cell phone. Note that the link that is transmitted to the user might be a conventional Internet address, a telephone number that must be dialled to retrieve the video work, etc. In fact, when the term "link" is used herein, that term should be broadly construed to include any sort of pointer or pathway to the file that contains the completed video work.

The notification text 710 preferably informs the user of the location of the completed video presentation and indicates how the user can access it for purposes of viewing and/or downloading. Preferably the user will be able to access the address that is stored in the text by selecting the "options" button 720. The extraction of specific links or telephone numbers from a text message is a function that has been available in most cell phones for quite some time now. Thus, this aspect of the instant invention need not be described in detail here. Additionally, it should be noted that the use of short messages as a way to notify the user is only one possible way of informing the user of the completed creation and the download location. For example, it is also possible that the user might be informed by a notice sent according to the multimedia messaging standard, or the remote server might contact the cell phone via email. As can be seen there are a number of possible variations and the instant invention shall not be limited to the use of a short message. In other variations, by activating the "forward" button 730 the user will be able to select additional or alternative recipients of the notification message from the telephone book that is incorporated into the cell phone. In this arrangement, the user will be able to forward the notification message—additionally or alternatively—to one or more other recipients so that these recipients will also be able to directly access the created video work. That being said, the presentation might not be displayed in the best possible quality on the alternative recipients' phones due to the fact that the video work was optimized and/or customized for the requestor's cell phone and, thus, its display parameters might not be compatible with those of the other phones or mobile display devices. Note that the term "forwarding" is used in the broadest sense herein to include messages that are literally forwarded (i.e., that are sent to the user's cell phone and then are further transmitted onward and/or those messages that are received at the user's cell phone company and transmitted to another phone number) as well as those instances where the central server directly contacts the additional/alternative recipients.

Figure 8:
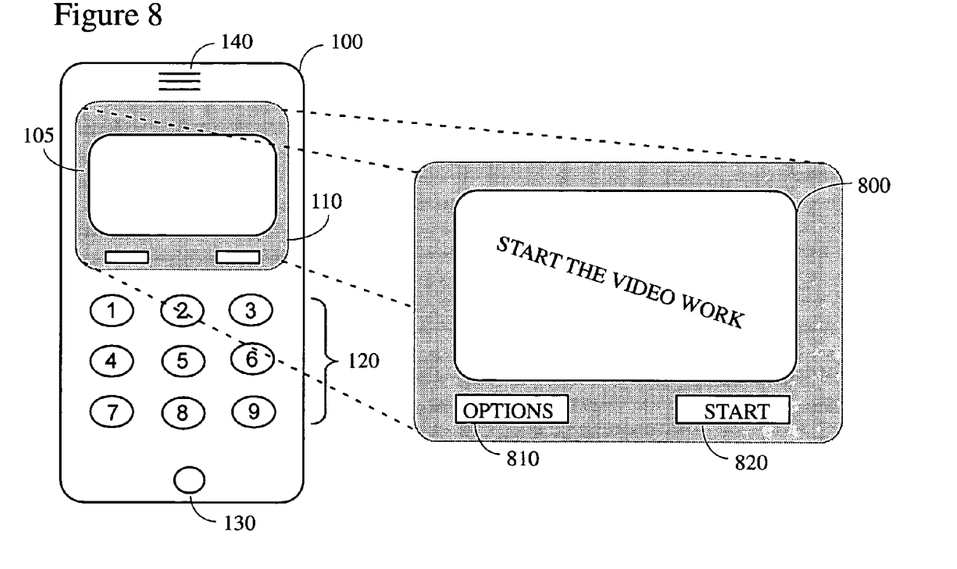
FIG. 8 depicts the graphical user interface on the camera cell phone after download of the created movie show presentation.

Turning next to FIG. 8, this figure illustrates how the screen of the users cell phone might appear after the user has elected to download the remotely-created movie to the cell phone. The user will preferably be presented with a portion 800 of the cell phone screen wherein the video presentation will be displayed. In the preferred embodiment, if the "start" button 820 is selected, the cell phone will preferably start the playback of the video file and the user will be able to enjoy his or her created video work. Additionally the user will preferably be able to control various aspects of the playback via the "options" button 810. For example, if the cell phone has an external speaker the user will preferably be able to play the audio portion of the movie over this speaker. In other variations, the user might elect to have the video work continuously replayed (i.e., to have the video work "looped").

Figure 9:
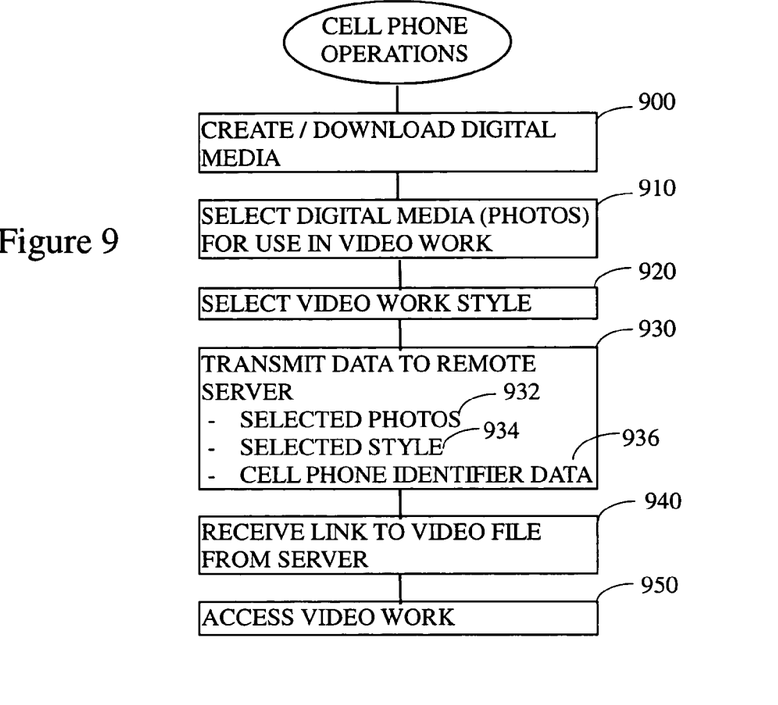
FIG. 9 illustrates a flowchart of the specific steps that are carried out by the user of the instant invention on the client side.

FIG. 9 illustrates a preferred workflow of the instant invention as it appears on the client side. Note that the instant invention can be broadly understood to fit within a client-server model wherein the client is the users cell phone and the server is the remote server. Although the instant invention is a complex process that involves the coordinated interaction between a cell phone and remote server, it is possible, in the interest of simplifying the discussion that follows, to discuss the instant invention as though it were two separate processes.

The process on the client (e.g., cell phone) side preferably begins with the creation of digital media (e.g., pictures or multimedia material) on the users cell phone 900. However it should be noted that it is not required that a user of the instant invention create the images on his or her cell phone: it is only required that the user's cell phone (or a memory card attached thereto) contain digital pictures or multimedia material, whatever the original source.

As a next preferred step the user will select the digital media that he or she wishes to incorporate into the video work 910. After the user has selected the digital media items that are to be included, the user will preferably be required to select the style that is to be used when the video work is created 920. Before being required to make that selection, the user will preferably be shown a preview of the style under consideration, the aim being to give the user some idea of what the assembled video will look like. This, of course, will enable the user to have some confidence that the completed work will reflect his or her tastes. In the preferred arrangement, a style will be at least partially defined by a plurality of parameters of the sort that are displayed in FIG. 11. For example, a style definition might include a parameter that controls the transition frequency 1110, wherein the setting defines how often in the complete movie show a transition is to be embedded into the video work.

Figure 11:
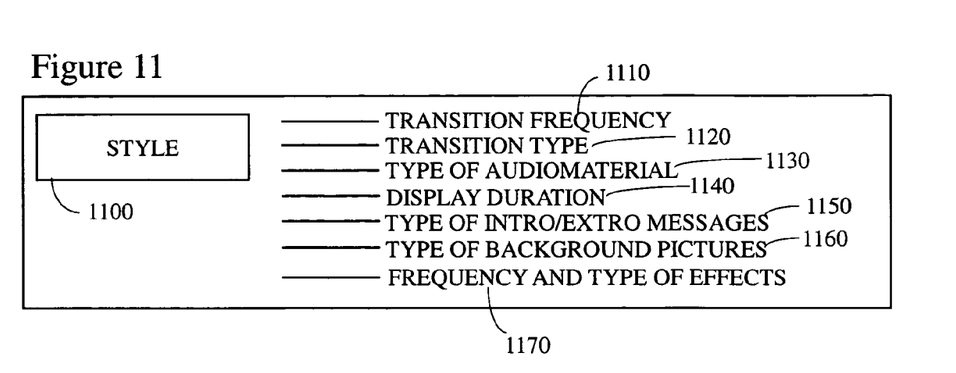
FIG. 11 depicts the specific internal structure of the selectable styles.

A style definition will preferably also contain a parameter that specifies a transition type 1120 to use between successive images or clips. Some examples of the sorts of transitions that might be provided for use with the instant invention include wipes, cross fades, iris, dissolve, page peel, push, etc. Other parameter values might specify whether or not audio material (e.g., background music) is to be added to the video work and, if so, the type (parameter 1130).

Another parameter that could be used to modify or customize the appearance of the remotely assembled video work is the display duration 1140. This parameter defines the length of time that each digital image or video clip is to be displayed in the final product. Still another parameter might be offered that allows the user to select an intro or extro message 1150 for addition to the beginning or ending of the video work, respectively. For example, the intro message "welcome to the 30s" could be added to inform the user that the selected video style will be reminiscent of the old pictures of the 1930s (e.g., sepia toned).

Another option that might be useful in some contexts would be to allow the user to add background pictures 1160 (or overlays) to the video work. The background pictures would preferably be selected in such as way as to further emphasize the user-specified style. In still another preferred arrangement, the user will be allowed to select from various effects that could be added to the video work (step 1170) including, for example, graphical effects that are applied to all or part of the video work such as an effect that adds a colourful firework over a specific part of a current section of the video work.

Turning again to FIG. 9, after the user has selected the video style 920 the user will preferably initiate a 'send" command (step 930). This action will preferably prompt the phone CPU to collect the information that is necessary to assemble the user's video work and then send that information to the remote server. The precise means by which the data will be transmitted will not be discussed here because such are well known by those of ordinary skill in the art.

The data that are preferably transmitted to the remote server consist of the selected digital still images and/or video clips in full size 932 as they exist on the cell phone, information that describes the selected style 934, and a code that identifies the type (e.g., model and brand) of cell phone 936. In the preferred arrangement, both the information about the selected video style and the cell phone type will preferably be reduced to a numerical code so that the amount of data that is to be transmitted is kept as small as possible. In some preferred embodiments, the still images and video clips will similarly be reduced in size by converting them to JPEG or MPEG (respectively) file types before transmission to the server. That being said, preferably the images will be transmitted at the same quality and size as they are available on the cell phone, thereby ensuring that the server has the best quality input for use in the steps that follow. In addition to the transmission of the above-identified data, the cell phone number of the originating phone will also be preferably transmitted to the remote server to enable the server to precisely identify the phone and/or user. After the data have been transmitted, attention turns to the process that operates on the remote server.

Figure 10:
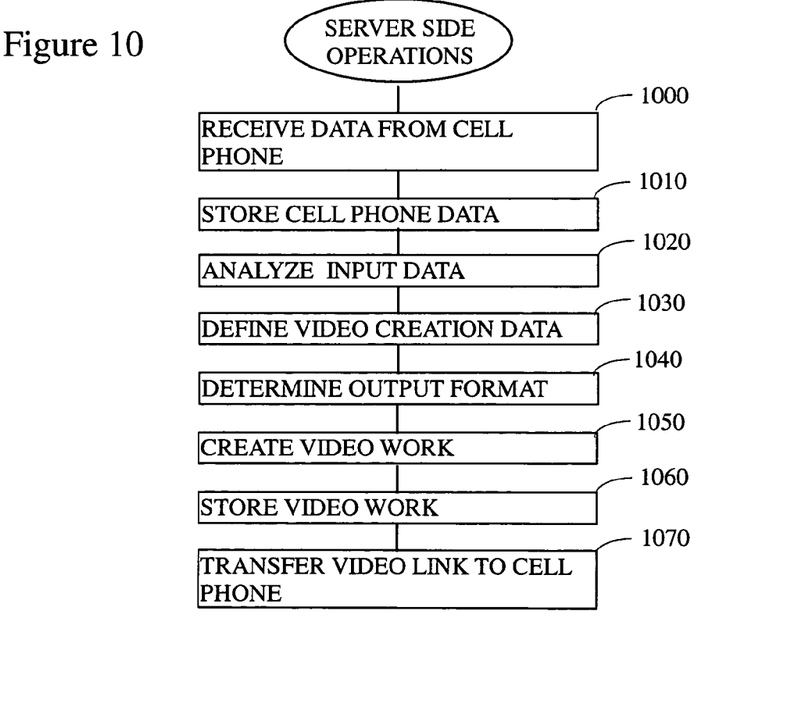
FIG. 10 contains a flowchart which illustrates the steps of the instant invention that are carried out on the remote server side.

The preferred server side actions are illustrated in FIG. 10. As a first preferred step, the remote server receives the data from the cell phone 1000 and stores that data in a database 1010 as a dataset. Preferably the phone number will be used as a unique identifier to make it possible to differentiate different users. Of course, the database dataset preferably will minimally contain the pictures that are transferred from the client, the style code and the cell phone ID. In another preferred embodiment payment additional parameters might be inserted into the dataset.

As a next preferred step 1020, the remote server analyses the input data, one goal of this analysis being the identification of the style settings that are to be applied as part of the video creation process. The remote server preferably compares the received style code with a database of styles stored in the remote server and, according to the result of the comparison, selects the predetermined properties for the user's chosen style 1030. In some embodiments, the user's data will contain user specified parameter modifications that adjust the appearance or functionality of the selected style.

Figure 12:
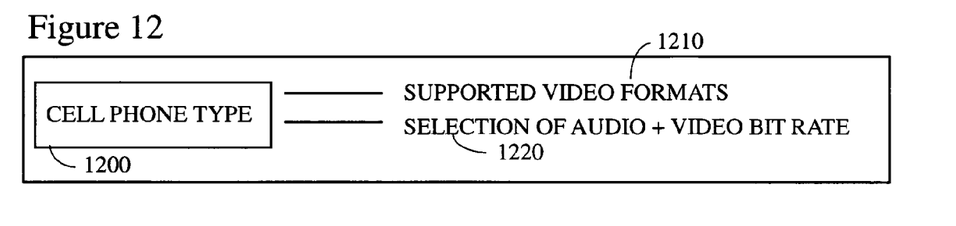
FIG. 12 illustrates some phone-related parameters that are preferably transmitted to the remote server.

The cell phone identification code is also compared to an internally stored database in the remote server that contains information of the sort that is generally described in FIG. 12. For example, the cell phone identification code preferably identifies the user's particular cell phone type 1200 (e.g., manufacturer and phone model). Preferably within the database will at least be stored the display parameters (e.g., LCD screen size in pixels, multimedia capabilities, video file formats supported, optimal audio and video bit rate, etc.) associated with each cell phone type, thereby making it possible for the server to create a compatible video work.

The use of such a database will help ensure that the quality of the video work that is created will be of the best possible that could be displayed on the requesting user's individual cell phone. Additionally, the instant invention preferably features a function that allows the programmer to update the content of the cell phone identification and feature database with additional information, thereby enabling the database to be updated as new phones are introduced. The updates could be distributed to the user in many different ways, for example they could be distributed automatically when the user connects to the remote server or the user could update it by downloading new settings manually via the Internet.

Turning again to FIG. 10, in the preferred embodiment the instant invention, after collecting the information from the user and about the user's phone, will automatically create a video compilation of the stored pictures and multimedia clips according to the style specified by the user and the hardware limitations of his or her own cell phone. The methods and procedures for automatically creating such a video work are well known to those of ordinary skill in the art and will not be discussed in detail here. The video work that has been created is then preferably converted into a video format 1050 that is supported by the user's cell phone according to the video and bit rate parameters either obtained from the phone or stored previously in the phone model database. As a next preferred step the instant invention stores the created video work—1060 and notifies the user preferably via the stored cell phone number 1070.

Now turning back to FIG. 9, in the preferred embodiment the user will receive notice that the video work has been assembled 940 via a short text message of the sort generally illustrated in FIG. 7. Preferably the message will include instructions for downloading or streaming the video to the user's phone. In some variations and as is indicated in FIG. 7, the user will be sent an URL at which location the movie may be accessed. In such an instance, the user may elect to download the video work from the remote server by selecting and/or clicking on the link embedded in the short message. In some embodiments, the video work will be streamed to the user's cell phone, however more generally it is preferred that the video be downloaded to the users mobile device to ensure that it will be viewable without network lag or other performance degradation. After the user has downloaded the video to his or her own cell phone it may be accessed 950 and viewed locally.

Figure 2:
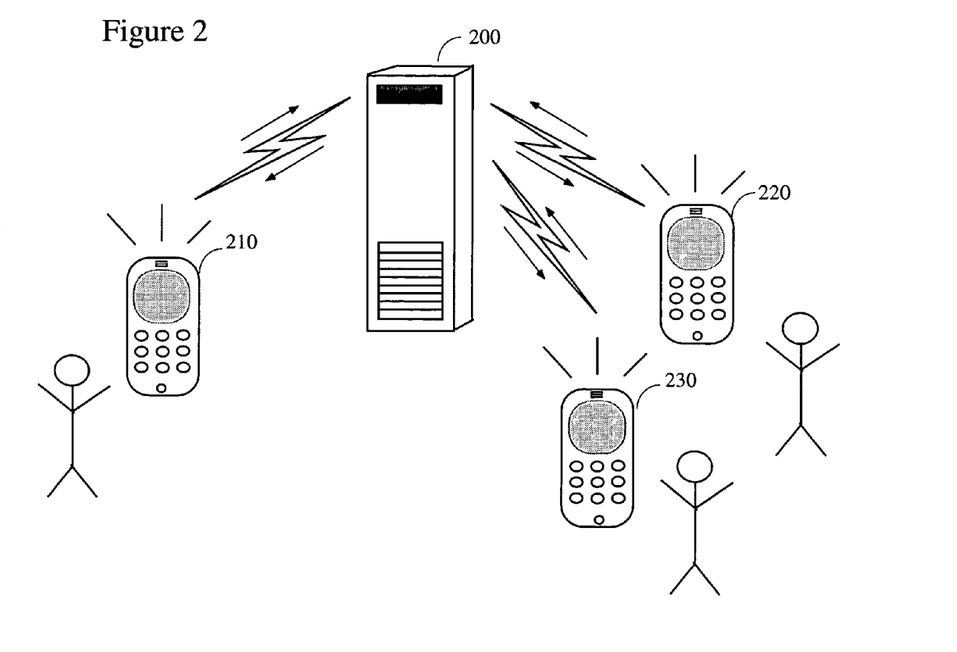
FIG. 2 depicts a general view of the working environment of the instant invention.

FIG. 2 illustrates in a general way a preferred configuration of the instant invention. As is indicated, preferably multiple users will be able to connect with a single server, for example, cell phone devices 210, 220 and 230 are able to communicate with the remote server 200 to initiate the specific processes of the instant invention.

CONCLUSIONS

Of course, many modifications and extensions could be made to the instant invention by those of ordinary skill in the art. For example in one preferred embodiment the selection of material might not be limited to pictures created on a cell phone, it may also be possible to select a variety of different media files, like video sequences or even captured audio material. Additionally, it might also be possible to couple a business method to the instant invention wherein the user has to pay different amounts of money depending on how many different pieces of content are added to transmitted and compiled into a video work.

Additionally, it should be noted and remembered that when the term "remote server" is used herein, that term should be broadly understood to be a single CPU in wireless communication with the user's cell phone as well as a multiplicity of CPUs that are networked together (wirelessly or wired) and on which at least a portion of the process of creating the user's video takes place.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of preparing a video work for display on a handheld device, comprising the steps of:
   a. selecting a plurality of media items from within said handheld device;
   b. selecting a video style;
   c. determining a device type of a first handheld device;
   d. wirelessly transmitting from said first handheld device at least said selected plurality of media items, an indicia representative of said selected video style, and an indicia representative of said device type to a remote server;
   e. automatically creating on said remote server an integrated video work from said selected media items according to said selected video style and said device type;
   f. transmitting a notification from said remote server to a second handheld device, said notification comprising at least a link to said integrated video work; and,
   g. viewing via said link said integrated video work on said second handheld device.

2. A method of preparing a video work for display on a handheld device according to claim 1, wherein said first handheld device and said second handheld device are a same handheld device.

3. A method of preparing a video work for display on a handheld device according to claim 1, wherein said plurality of selected media items includes at least two digital still images.

4. A method of preparing a video work for display on a handheld device according to claim 3, wherein said integrated video work comprises a video slide show containing at least said at least two digital images.

5. A method of preparing a video work for display on a handheld device according to claim 1, wherein said integrated video work comprises a video portion and an audio portion, said audio and video portions being designed to be played simultaneously.

6. A method of preparing a video work for display on a handheld device according to claim 1, wherein said integrated video work comprises a single video file.

7. A method of preparing a video work for display on a handheld device according to claim 1, wherein said first handheld device and said second handheld device are selected from a group consisting of a cell phone and a PDA.

8. A method of preparing a video work for display on a handheld device according to claim 1, wherein said first handheld device is a cell phone and said device type is representative of a manufacturer and a model of said cell phone.

9. A method of preparing a video work for display on a handheld device according to claim 1, wherein said link to said integrated video work comprises an Internet link to said video work.

10. A method of preparing a video work for display on a handheld device according to claim 1, comprising the further step of:
   (h) storing at least a portion of said viewed integrated video work on said second handheld device.

11. A method of preparing a video work for display on a handheld device according to claim 1, comprising the further steps of:
   (h) transmitting said notification to at least one additional handheld device different from said second handheld device, and,
   (i) within at least one of said additional handheld devices different from said second handheld device, viewing via said link said integrated video work on said second handheld device.

12. A method of preparing a video work for display on a handheld device according to claim 1 wherein step (d) comprises the step of wirelessly transmitting via a cellular telephone signal at least said selected plurality of media items, said indicia representative of said selected video style, and said indicia representative of said device type to a remote server.

13. A method of preparing a video work for display on a handheld device according to claim 1 wherein step (d) comprises the step of wirelessly transmitting via Bluetooth at least said selected plurality of media items, said indicia representative of said selected video style, and said indicia representative of said device type to a remote server.

14. A method of preparing a video slide show for display on a cellular telephone, comprising the steps of:
   a. within said cellular telephone, selecting a plurality of digital images;
   b. within said cellular telephone, selecting a video style;
   c. determining a device type of said cellular telephone;
   d. wireless transmitting at least said selected plurality of media items, said selected video style, and said device type from said cellular telephone to a remote server;
   e. creating within said remote server a video slide show using at least said selected digital images according to said selected video style and said device type;
   f. transmitting a notification to said handheld device, said notification comprising at least a link to said integrated video work; and,
   g. downloading via said link said integrated video work to said handheld device, thereby preparing said integrated video work for display on said cellular telephone.

15. A method of preparing a video slide show for display on a cellular telephone according to claim 14, wherein step (a) comprises the steps of:
   (a1) selecting within said cellular telephone a plurality of digital images, and,
   (a2) selecting at least one audio work, and,
wherein step (d) comprises the step of:
   (d1) wireless transmitting at least said selected plurality of media items, at least an indicia of said selected at least one audio work, said selected video style, and said device type from said cellular telephone to a remote server.

16. A method of preparing a video slide show for display on a cellular telephone according to claim 14, wherein step (e) comprises the steps of:
   (e1) reading a representation of said selected audio work according to at least said transmitted audio work indicia,
   (e2) creating a video slide show work using at least said selected digital images and said read audio work according to said selected video style and said device type.

17. A method of preparing a video slide show for display on a cellular telephone according to claim 16, wherein step (d) comprises the steps of:
   (d1) wireless transmitting at least said selected plurality of media items, said selected at least one audio work, said selected video style, and said device type from said cellular telephone to a remote server, and,
wherein step (e2) comprises the step of:
   (i) creating a video slide show work using at least said selected digital images and said transmitted at least one audio work according to said selected video style and said device type.

18. A method of preparing a video work for display on a handheld device according to claim 17, wherein said handheld device is selected from a group consisting of a cell phone and a PDA.

19. A method of preparing a video work for display on a handheld device having a digital camera integral thereto, comprising the steps of:
   a. capturing a plurality of digital images using said digital camera;
   b. storing said plurality of captured images in said handheld device;
   c. selecting at least two digital images from within said plurality of digital images;
   d. selecting a video style;
   e. determining a device type of said handheld device;
   f. wirelessly transmitting from said handheld device to a remote server at least said selected plurality of digital images, an indication of said selected video style, and an indication of said device type to a remote server;
   g. creating within said remote server an integrated video work from said selected digital images according to said selected video style and said device type;
   h. initiating from said remote server a transmission of a notification to said handheld device, said notification comprising at least a link to said integrated video work; and,
   i. downloading via said link said integrated video work to said handheld device, thereby preparing said integrated video work for display on said handheld device.

20. A method of preparing a video work for display on a handheld device according to claim 19, wherein said integrated video work comprises a video portion and an audio portion, said audio and video portions being designed to be played simultaneously.

21. A method of preparing a video work for display on a handheld device according to claim 19, wherein said integrated video work comprises a single video file.

22. A method of preparing a video work for display on a handheld device according to claim 19, wherein said link to said integrated video work comprises an Internet link to said video work.

23. A method of preparing a video work for display on a handheld device according to claim 19, comprising the further step of:
 (h) viewing at least a portion of said downloaded integrated video work on said handheld device.

* * * * *